US011632522B2

(12) United States Patent
Donnan

(10) Patent No.: US 11,632,522 B2
(45) Date of Patent: Apr. 18, 2023

(54) MOBILE VIDEO SURVEILLANCE RECORDING SYSTEM

(71) Applicant: Joseph Donnan, Burr Ridge, IL (US)

(72) Inventor: Joseph Donnan, Burr Ridge, IL (US)

( * ) Notice: Subject to any disclaimer, the term of this patent is extended or adjusted under 35 U.S.C. 154(b) by 0 days.

(21) Appl. No.: 17/546,698

(22) Filed: Dec. 9, 2021

(65) Prior Publication Data

US 2022/0191433 A1    Jun. 16, 2022

Related U.S. Application Data

(60) Provisional application No. 63/199,166, filed on Dec. 11, 2020.

(51) Int. Cl.
| | |
|---|---|
| *H04N 17/00* | (2006.01) |
| *H04N 5/77* | (2006.01) |
| *H04N 5/247* | (2006.01) |
| *H04N 7/18* | (2006.01) |
| *H04L 67/12* | (2022.01) |

(52) U.S. Cl.
CPC ............. *H04N 7/181* (2013.01); *H04N 5/77* (2013.01); *H04N 17/00* (2013.01); *H04L 67/12* (2013.01); *H04N 5/247* (2013.01)

(58) Field of Classification Search
CPC ...... H04N 5/2628; G06V 30/10; G06V 20/40; G11B 27/031
See application file for complete search history.

(56) References Cited

U.S. PATENT DOCUMENTS

| | | | | |
|---|---|---|---|---|
| 6,078,850 | A * | 6/2000 | Kane | ...................... G06Q 50/06 700/282 |
| 2006/0232891 | A1* | 10/2006 | Bushnik | .................... G06F 1/20 |
| 2006/0279423 | A1* | 12/2006 | Nazari | ............. G08B 13/19693 340/541 |
| 2007/0216771 | A1* | 9/2007 | Kumar | .................... B61L 27/53 348/148 |
| 2018/0332236 | A1* | 11/2018 | Glaser | .................. H04N 5/2254 |
| 2020/0356774 | A1* | 11/2020 | Korn | ...................... G06V 10/82 |
| 2020/0366871 | A1* | 11/2020 | Cury | .................. H04N 5/23238 |

\* cited by examiner

*Primary Examiner* — Thai Q Tran
*Assistant Examiner* — Jose M Mesa
(74) *Attorney, Agent, or Firm* — Doherty Wallace Pillsbury Murphy

(57) ABSTRACT

The video recording system comprises a video recorder and one or more cameras which is specially designed to record video on the exterior and interior of a locomotive. The system is capable of withstanding the railroad environment, and has been designed to maximize safety and to minimize liability. The video recording system is capable of recording video on at least two drives (same video or different video on at least two drives) thereby creating redundancy in case one of the videos is unclear and/or damaged.

13 Claims, 16 Drawing Sheets

Example of Software Playback with Event Recorder Integration

Chain Encryption And Fingerprint Check

Fixed Twin View Module with H.265 Plus Intelligent Code On

Audio Source from Mic 1, Mic 2 or Camera audio

MOBILE VIDEO SURVEILLANCE RECORDING SYSTEM

BACKGROUND OF THE INVENTION

1. Field of the Invention

The present disclosure relates generally to a video recording system, and more particularly to a video recording system particularly useful in transit environments and more particularly in the railroad environment.

BRIEF SUMMARY OF THE INVENTION

Disclosed herein is a video recording system that is full featured, highly reliable, steel constructed, and designed for use in rail applications. The system delivers clear, high quality video and optimal network performance, and is made for the rigors of transit environments and particularly with those of the locomotive and heavy rail environment. The system supports PoE megapixel and analog cameras with separate encoder, and provides a user-friendly and technologically advanced solution for video surveillance, particularly, in the application of the video surveillance in transit environments, and particularly to heavy rail environments. The system is Military-Specification ("Mil-Spec") and Society of Automated Engineers ("SAE") rated for proven resilience and dependability in the rail environment. The system is built to withstand extreme climatic conditions, featuring robust M12 connectors and a completely sealed and water-resistant chassis, while recording the clearest and highest quality audio/video. The system has been tested and meets Federal Railroad Administration ("FRA") specifications FRA 49 CFR part 229 and the Association of American Railroads ("AAR") specifications AAR S-9401 (5702) and EN 50155. The system is easy to use, provides superior video quality, and delivers years of reliable service with the lowest cost of ownership.

These and other features and advantages of the present invention will be more fully understood from a reading of the following detailed description with reference to the accompanying drawings.

DETAILED DESCRIPTION OF THE INVENTION

The video recording system comprises a dual/multiple stream functionality which allows the system to record at least two signals at the same time from the same camera while also viewing live stream. One signal is preferably in high definition and is stored for up to about 5 days. In an exemplary embodiment, unless the data is saved by, for example, manual means, the data stored on the high definition side is recorded over. The other signal is preferably in lower definition and is stored for up to about 30 days. In this embodiment, the same camera can record the same images at two (or more) resolutions so that they can be stored to meet a storage requirement of 30 days.

The system provides a balance of high-definition recording and long-term storage. In an exemplary embodiment, a high definition and long-term video stream is recorded simultaneously ensuring that the highest quality video is available for critical incidents while maintaining the longest onboard recording duration needed by a user, such as, e.g., a length necessary to comply with government requirements. Completely adjustable and customizable to a user's recording needs, the system may comprise a slider bar that automatically calculates estimated storage for both high quality and long-term recording streams.

In an exemplary embodiment, the system supports power over ethernet ("PoE") digital high-definition internet protocol ("IP") cameras which deliver clear, high quality video over a single cable. Accordingly, the video recording system provides a user-friendly and technologically advanced solution for mobile video surveillance while including all the high-quality features of a standard stationary IP system.

In an exemplary embodiment, the video recording system can support up to 12 IP A/V channels which can connect to auto detect and configure specially designed IP cameras with up to about a 4k (about 3840× about 2160) pixel high definition resolution. The system can support multiple storage options ranging from about 256 GB to about 4 TB solid state drive technology. To guarantee that the critical data stored is available on demand, the system may include an option to protect the data by utilizing Redundant Array of Independent Disks (R.A.I.D.) configurations and an available Crash Hardened Memory Module. Retrieving the data is simple, using the software which is a part of the system.

Figure 11:
FIG. 11 is an image depicting views taken by the cameras depicted in FIGS. 6-10.
Figure 12:
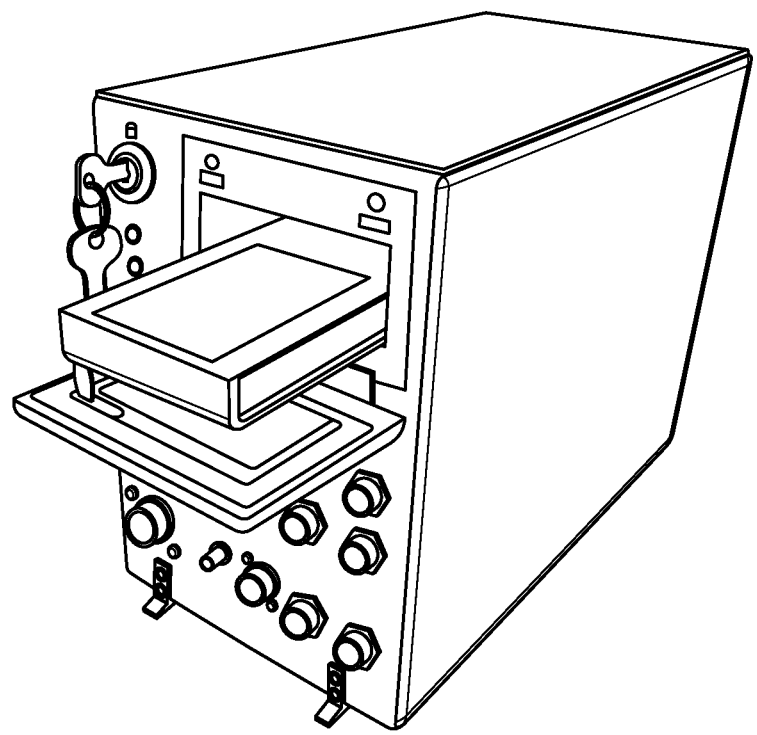
FIG. 12 is a schematic depicting an exemplary video recorder and an exemplary solid state storage drive.

In an exemplary embodiment, the video recording system comprises up to 12 cameras which are positioned to optimize visibility. Where the video recording system is to be used for heavy rail equipment such as passenger coaches, and locomotives, the cameras may be placed in and/or outside of the heavy rail equipment or locomotive to optimize visibility. See, e.g., FIG. 11.

In an exemplary embodiment, the video recording system comprises up to about 14 audio inputs each of which may provide audio input from a different source. For example, when the video recording system is used in the railroad industry, an audio input may indicate that a warning bell rang at the correct time, another audio input may indicate that the conductor blew the horn at the correct time and for the correct amount of time.

In an exemplary embodiment, the video recording system comprises an auto-connect and auto-configuration feature which allows for the immediate connection and configuration of a replacement camera into the system. In this embodiment, if a camera fails and needs to be replaced, the replacement camera may be plugged in and the software may auto-connect the replacement camera to the system and auto-configure the camera to the system.

In an exemplary embodiment, the system is designed and manufactured specifically for military and rail applications. To this end, in an exemplary embodiment, the system comprises a video recorder—preferably one that is steel-constructed—that is Mil-Spec and SAE rated for proven durability and reliability in harsh mobile applications. All components of the system are robust and designed to perform in all elements, with added protection for water intrusion, shock, vibration, temperature extremes, voltage fluctuations and power loss.

In an exemplary embodiment, the system comprises a 40-100 V DC power unit.

In an exemplary embodiment, the system comprises dual hard drives with rapid fail over capabilities to thereby ensure that data will be available in the case of a single hard drive failure.

In an exemplary embodiment, the system comprises video streaming capabilities, and therefore the system is wireless-ready for use with any TCP/IP based network and compatible with existing wireless 802.11 and cellular modem devices.

In an exemplary embodiment, the system supports plug and play functionality. Such functionality allows cameras and microphones to be easily installed with no programming or networking expertise required. The auto-connect feature of the camera(s) of the system provides a common set up across all cameras while thereby saving hours on installation and/or repair.

Figure 1:
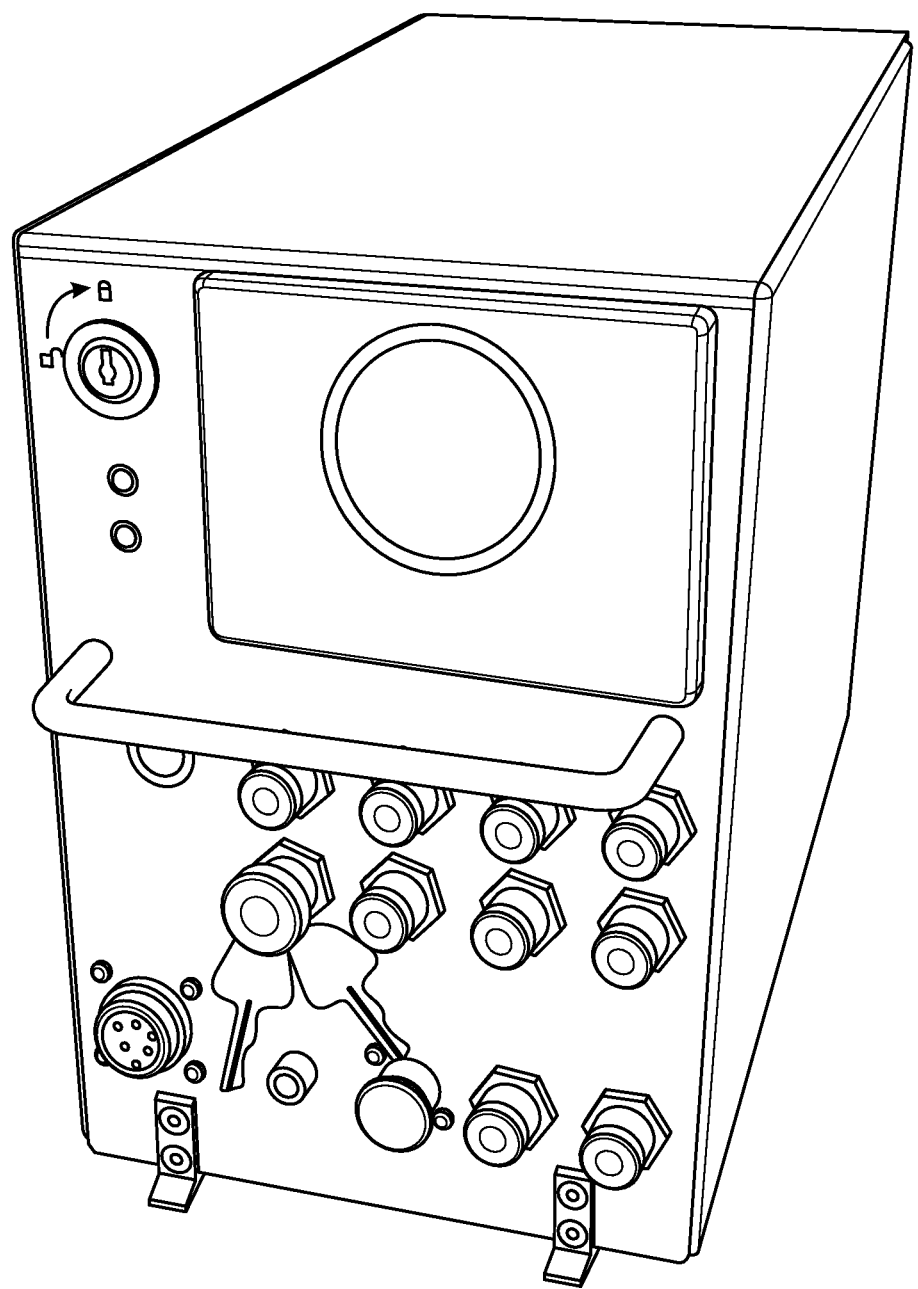
FIG. 1 is an image depicting an exemplary video recorder.
Figure 2:
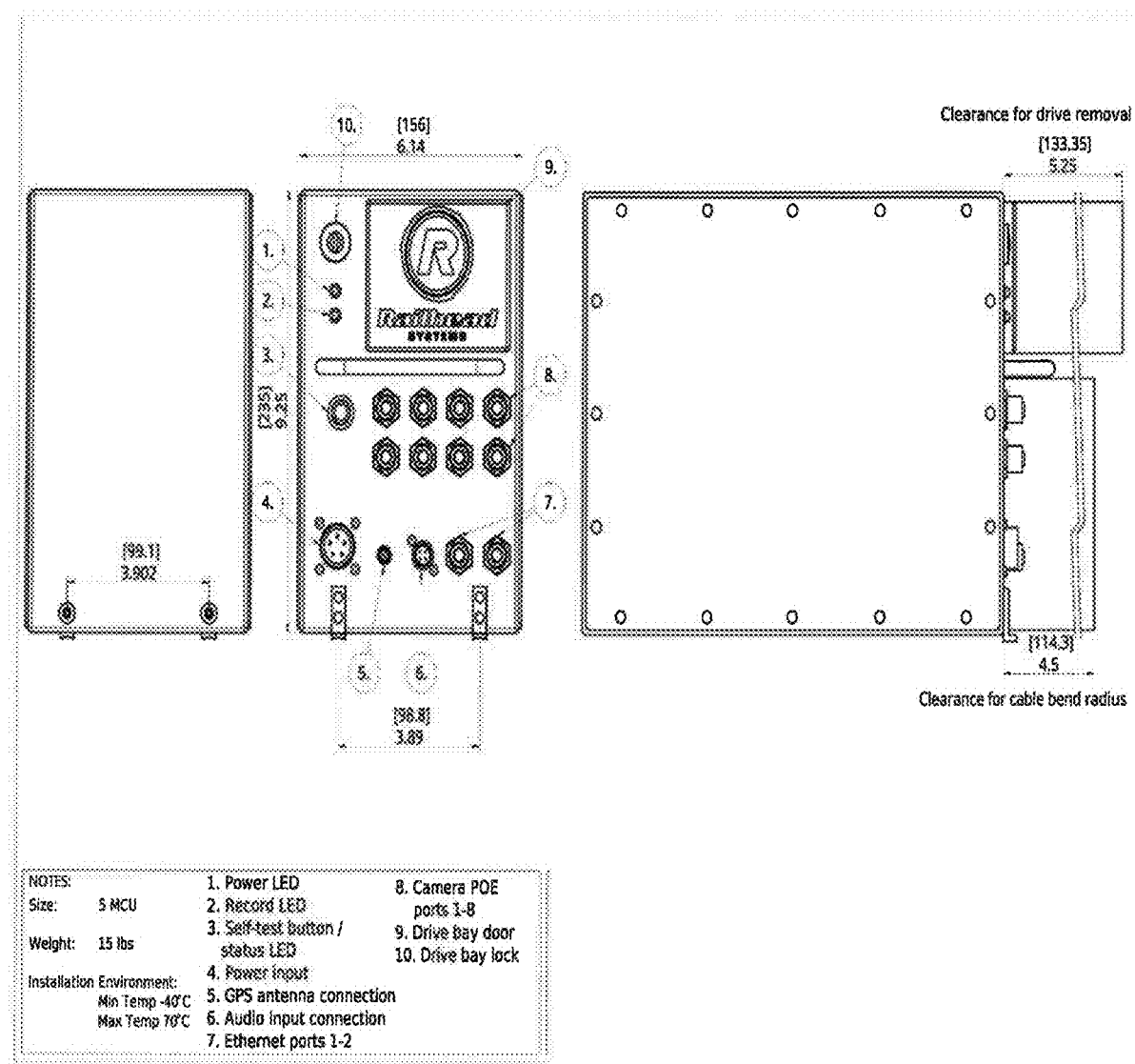
FIG. 2 is a schematic depicting the video recorder depicted in FIG. 1.
Figure 3:
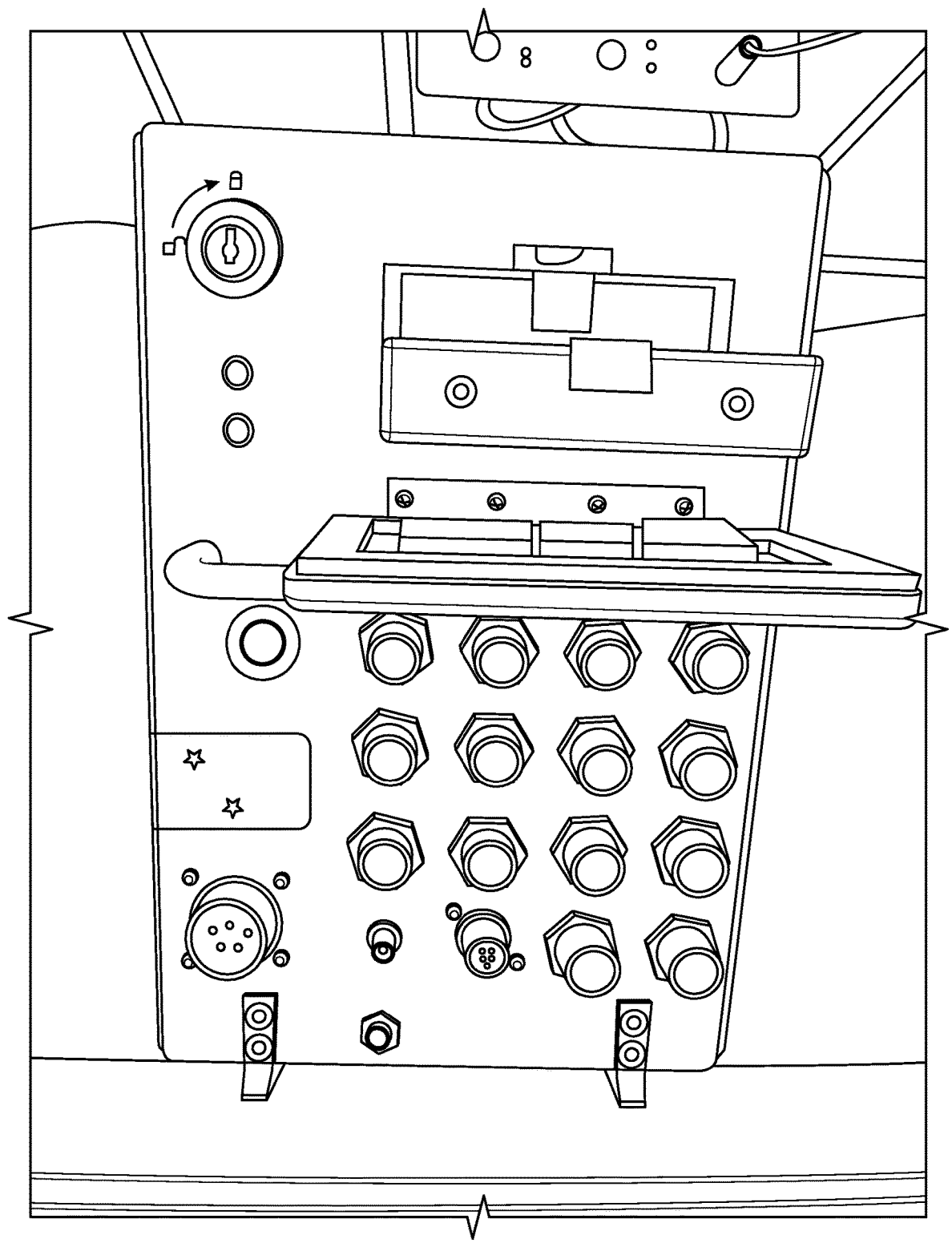
FIGS. 3 and 4 are images depicting another exemplary video recorder.
Figure 4:
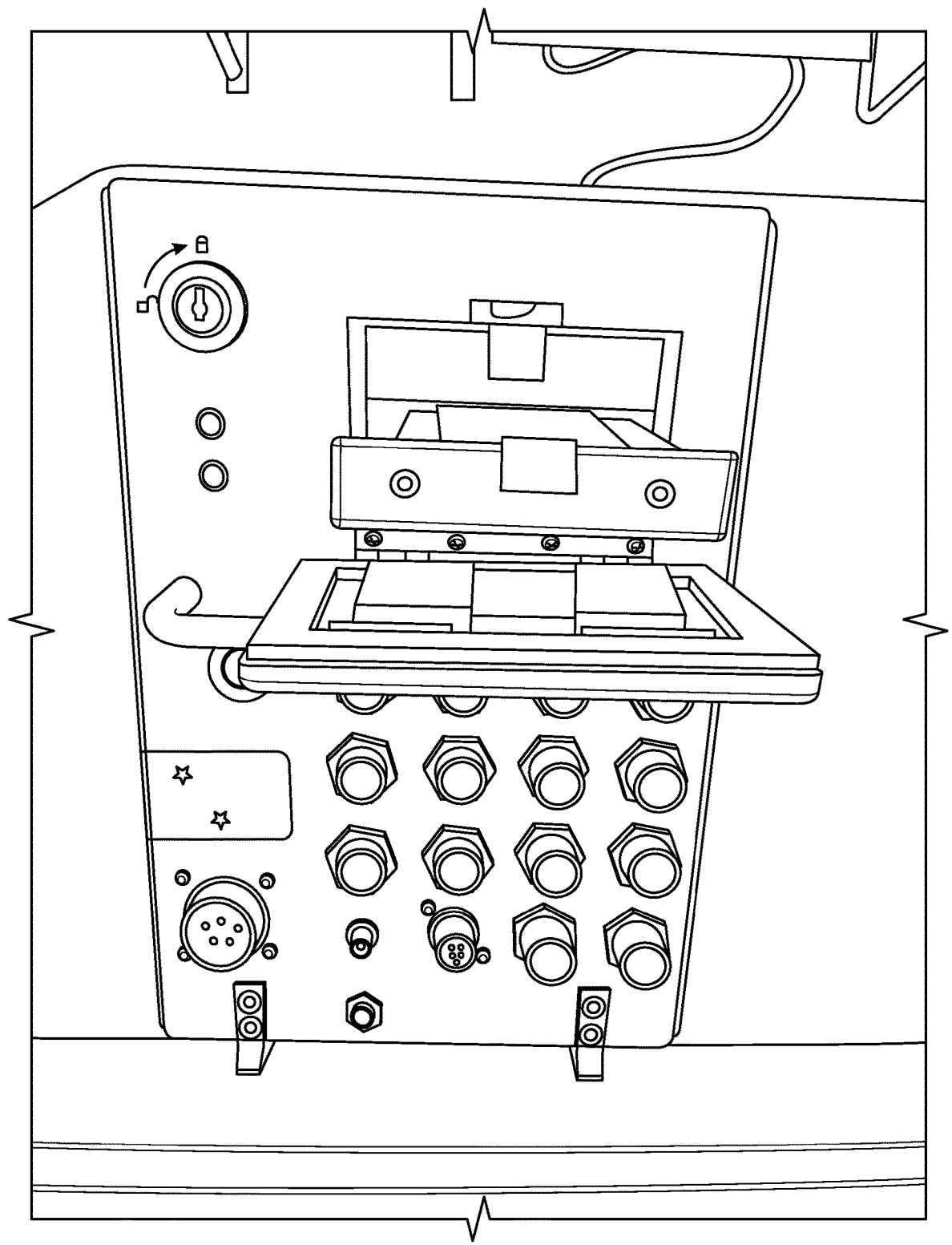
Figure 5:
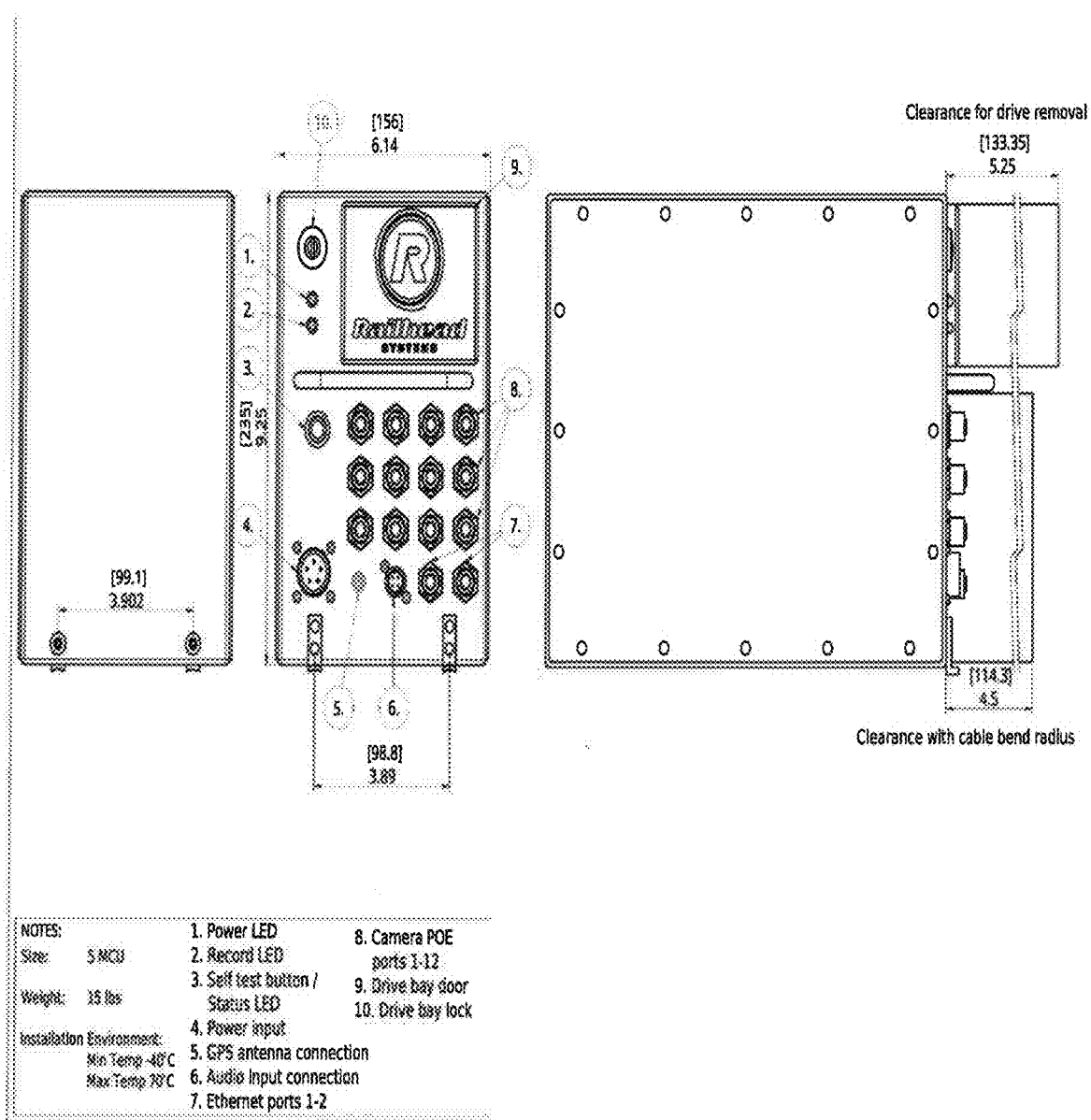
FIG. 5 is a schematic depicting the video recorder depicted in FIGS. 3 and 4.

The video recording system comprises a video recorder. An exemplary video recorder, which supports up to 12 cameras and 14 audio inputs, is depicted in FIGS. 1 and 2. Here, the video recorder comprises:

High-definition recording of up to about 3840×2160 pixels, wherein the pixels may be adjusted for each camera;

recording rates of up to about 480 high-definition images per second ("ips") plus an additional 480 W-CIF ips system-wide;

PoE megapixel camera support;

up to about 8.0 TB of removable storage;

a built-in or external GPS receiver that allows for interactive speed and mapping interface to thereby enhance searches;

Mil-Spec and SAE rated for shock and vibration;

an integrated push-to-test event switch with "heartbeat" health indicator;

secure management software for easy remote viewing, playback and administration, wherein the software is backward compatible with the latest version of the video recording system to thereby provide a seamless, fleet-wide solution;

128-bit video encryption;

wireless-ready for use with any TCP/IP based network;

fully compatible with specially designed software that enables fleet-wide management and health monitoring; and optional video encoders that provide an easy and cost-effective migration to high definition to thereby retain existing analog cameras while gaining the advantages of high definition for areas of particular need.

Another exemplary video recorder is depicted in FIGS. 1 and 2. Here, the video recorder comprises the following features:

up to 12 high definition IP cameras;

high definition recording up to about 3840×2160 pixels;

PoE digital camera support; and video is encrypted to ensure authenticity.

Figure 13:
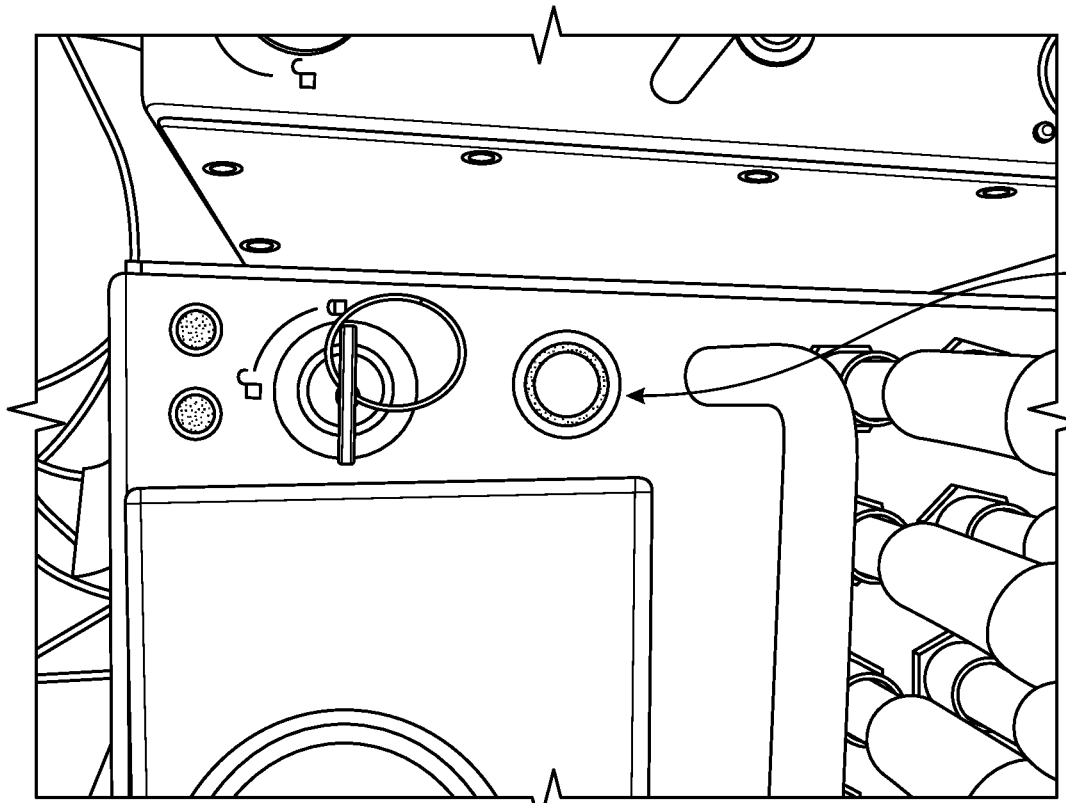
FIG. 13 is an image of an exemplary video recorder which includes a push to test button.
Figure 13:
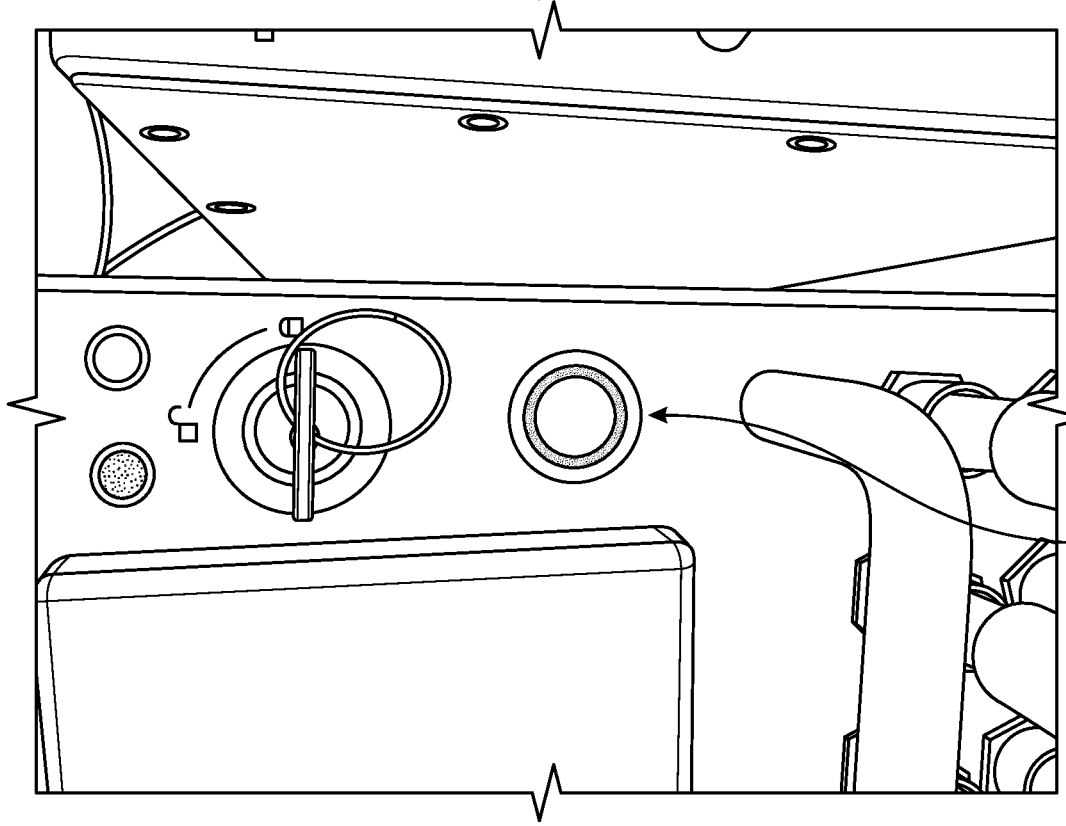

In an exemplary embodiment, the system includes the embodiment depicted in FIGS. 1 and 2 in combination with a solid state drive having storage up to about 8.0 TB and which may be removable via a key lock; audio having 12 audio channels and 2 designated audio channels; 12 PoE ports for cameras and/or data acquisition devices and 2 ethernet ports for download and/or remote access capabilities; differential GPS, preferably with a built in 3-axis accelerometer; an LED display preferably comprising an outward facing LED "push to test" light with "heartbeat" health indicator; a power hold up which provides shut down protection following a power loss; MIL-Spec and SAE rated for shock and vibration; a playback member which may comprise an RSM software historical event recorder, imagery, and map viewer; and a wireless communication feature which allows the system to be wireless ready for use with any TCP/IP based network and compatible with existing wireless and cellular modem devices, as depicted in FIG. 13.

The video recorder further comprises a super capacitor power backup that provides shut down protection for up to about thirty seconds in the event of a power loss. The video recorder is in communication with a software program that is preferably backwards compatible such as software offered under the name Railhead System Manager software. The video recorder comprises power and status light emitting diode ("LED") indicators, thereby allowing a user to more easily diagnose and determine proper operation of the system. The video recorder provides an open interface to data acquisition devices. The video recorder provides optimal network performance with state-of-the-art H.264/H.265 compression. This allows about a 75% bit rate reduction than older MPEG-4 encoding. Better compression means that the video recorder allows for longer recording time on the same size SSD and provides for latency free network transmissions for live viewing and faster downloads.

Figure 6:
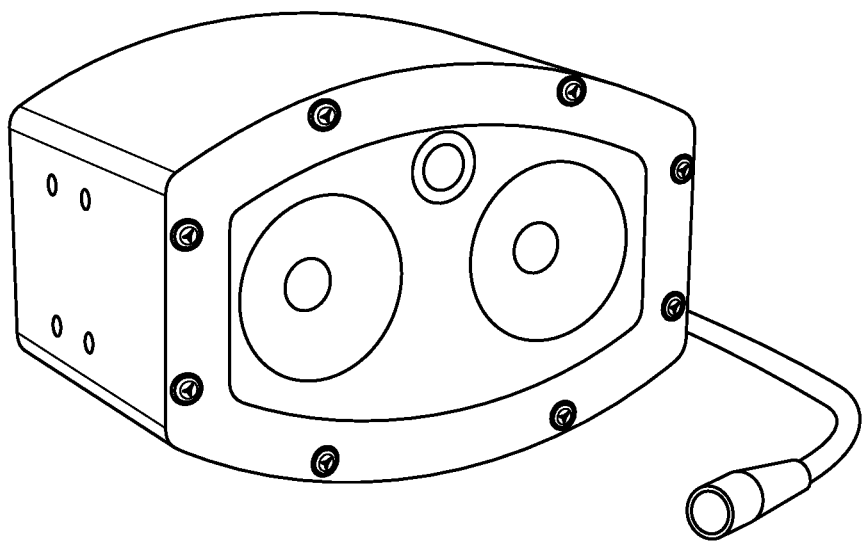
FIG. 6 is an image depicting an exemplary twin view forward and rear facing camera.

In addition to a video recorder, the video recording system comprises one or more cameras. FIG. 6 depicts an exemplary forward and rearward facing camera. In an exemplary embodiment, the camera is essentially two cameras in one. The camera is designed to have a long-range view for capturing, e.g., signal colors and the views down the tracks. The wide field of view camera is designed to capture, e.g., crossing, crossing gates, platforms, and other activities close to the locomotive. Both camera modules support the following features: low light recording capabilities; designed to meet IP66 ratings; ruggedized for the rail environment; impact, vandal resistant, and tamper proof; powered over a single ethernet cable which is PoE compliant; high resolution options 4K (3840×2160) (FHD (1920×1080), HD (1280×720), W-D1 (854×480), Q-HD (640×360), and W-CIF (432×240)); auto connect and configuration; and fully adjustable for optimal placement in all types of transit vehicles.

Figure 7:
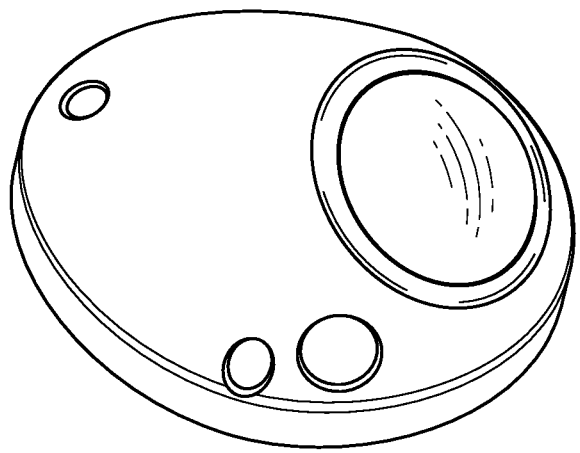
FIG. 7 is an image depicting an exemplary low profile inward facing camera.
Figure 8:
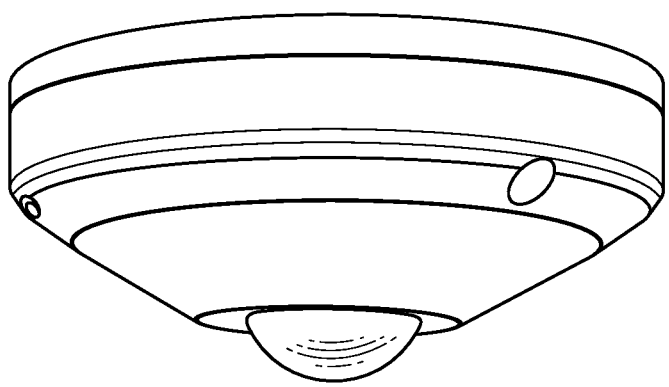
FIG. 8 is an image depicting an exemplary 360 degree inward camera.

FIG. 7 depicts an exemplary low profile inward facing camera. This camera is particularly advantageous in capturing cab activities in both day and night settings (see, e.g., FIG. 10). Additionally, the camera is designed to hold up to the rugged rail environment in both the cab and passenger compartments of rail equipment. The camera depicted in FIG. 6 comprises the following features:

- H.265 compression
- audio recording capable with adjustable gain;
- low light recording capabilities;
- ruggedized for rail environment can survive hit from an 8 pound hammer and has tamper resistant screws;
- impact, vandal resistant, and tamper-proof;
- PoE compliant cable;
- smart "IR" for low light recording;
- high resolution options;
- 4K (3840×2160) HD (1280×720) W-D1 (854×480) Q-HD (640×360) W-CIF (432×240); and
- Auto connect and configuration.
- NDAA and EN 50155 compliant FIG. 8 depicts a 360 degree inward camera that delivers high quality video and a wider field of view, thereby maximizing coverage, eliminating blind spots, and reducing installation time. The 360 camera is designed to capture in cab activities in both day and night settings (see, e.g., FIG. 11). The camera is further designed to hold up to the rugged rail environment in both the cab and passenger compartments of rail equipment. The 360 degree inward camera has the following features:

- H.265 compression
- ruggedized for rail environment can survive hit from an 8 pound hammer and has tamper resistant screws;
- impact, vandal resistant, and tamper-proof;
- PoE compliant cable;
- high resolution options;
- resolution (2560×2048), (1536×1536), (640×512), (512×512);
- auto connect and configuration;
- ePTZ, de-warping and panoramic modes; and
- NDAA compliant and EN 50155 compliant.

Figure 9:
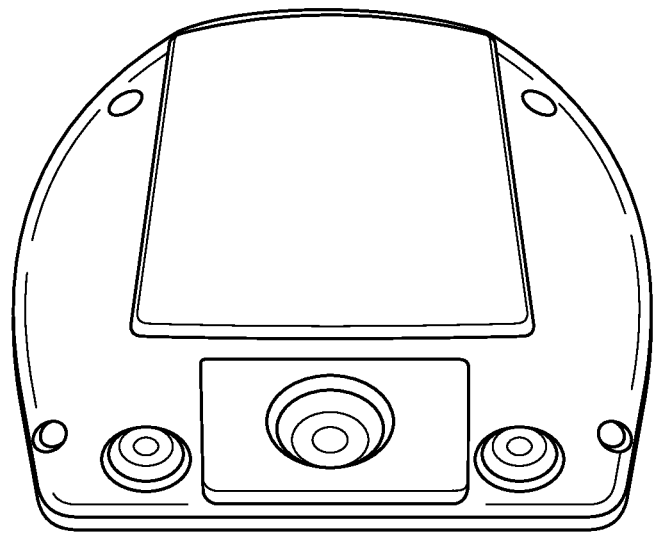
FIG. 9 is an image depicting a heated wedge camera.
Figure 10:
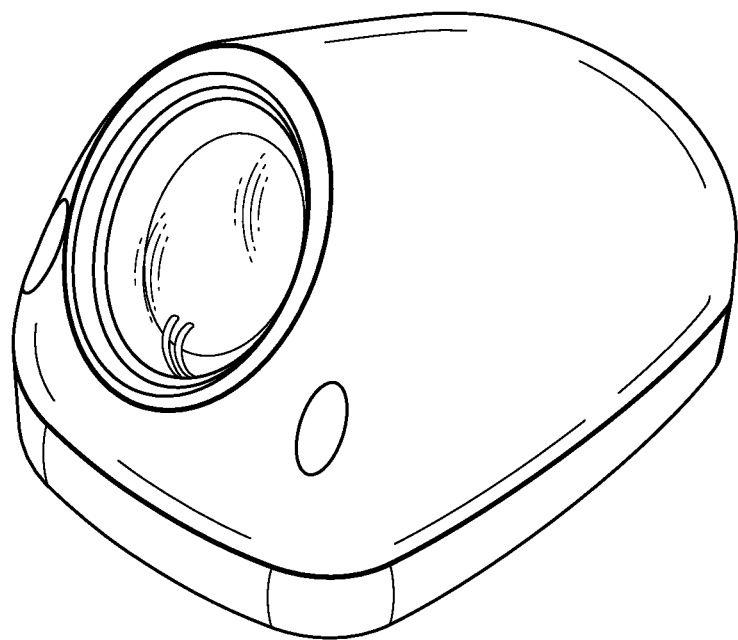
FIG. 10 is an exemplary side view wedge camera.

FIG. 9 depicts a heated wedge camera. FIG. 10 depicts a side view wedge camera. This camera captures the right of way, incidents, and railroad signal aspects in the rear view. This view has proven valuable in the past for risk management departments. Capturing rear view incidents, in addition to the forward-facing camera depicted in FIG. 6, enables accident investigators, claims, and legal departments to see a more detailed view of the incident. In an exemplary embodiment, the side view wedge camera has the following features:

- H.265 compression;
- impact, vandal resistant, and tamper-proof;
- PoE compliant cable;
- high resolution options;
- resolution F-HD (1920×1080), HD (1280×720), W-D1 (864×480), QHD (640×360), W-CIF (432×240);
- auto connect and configuration; and
- NDAA and EN 50155 compliant.

In addition to a video recorder and a camera(s), the video recording system comprises a solid state storage drive ("SSD Device"). The storage capacity of the SSD Device ranges up to about 8 terabytes which provides up to about 10 days of storage. The SSD Device has no moving parts unlike traditionally used hard disk drives, thereby reducing the risk of failure in the event of an accident. Additionally, the SSD Device are more tolerant to shock, vibration and temperature as compared to conventionally used storage devices. The video recorder supports having two drives installed which can be set up to run in a RAID mirroring configuration, thereby allowing for data redundancy between the two drives and protecting against single drive failures.

Figure 17:
FIG. 17 are images of the software system features.
Figure 17A:
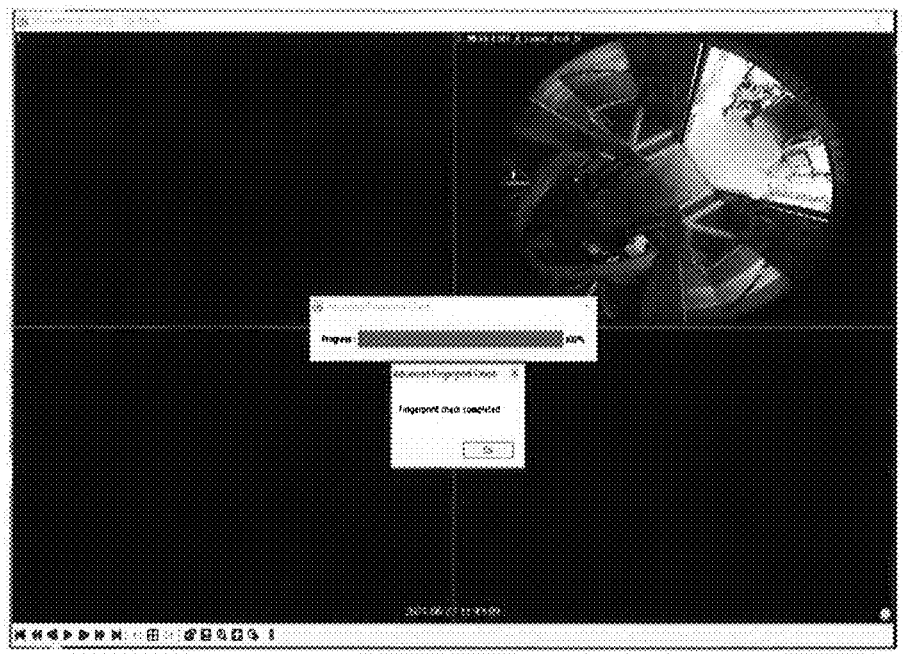
FIG. 17A is an additional image of software system features.
Figure 17A:
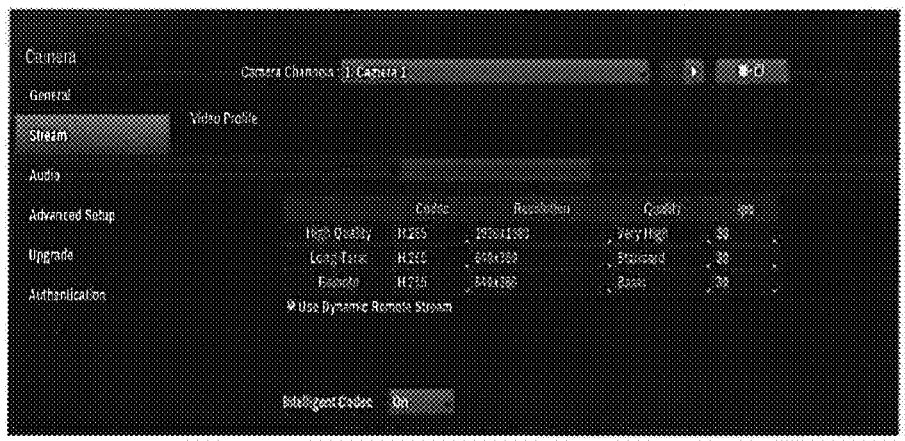
Figure 17A:
Figure 19:
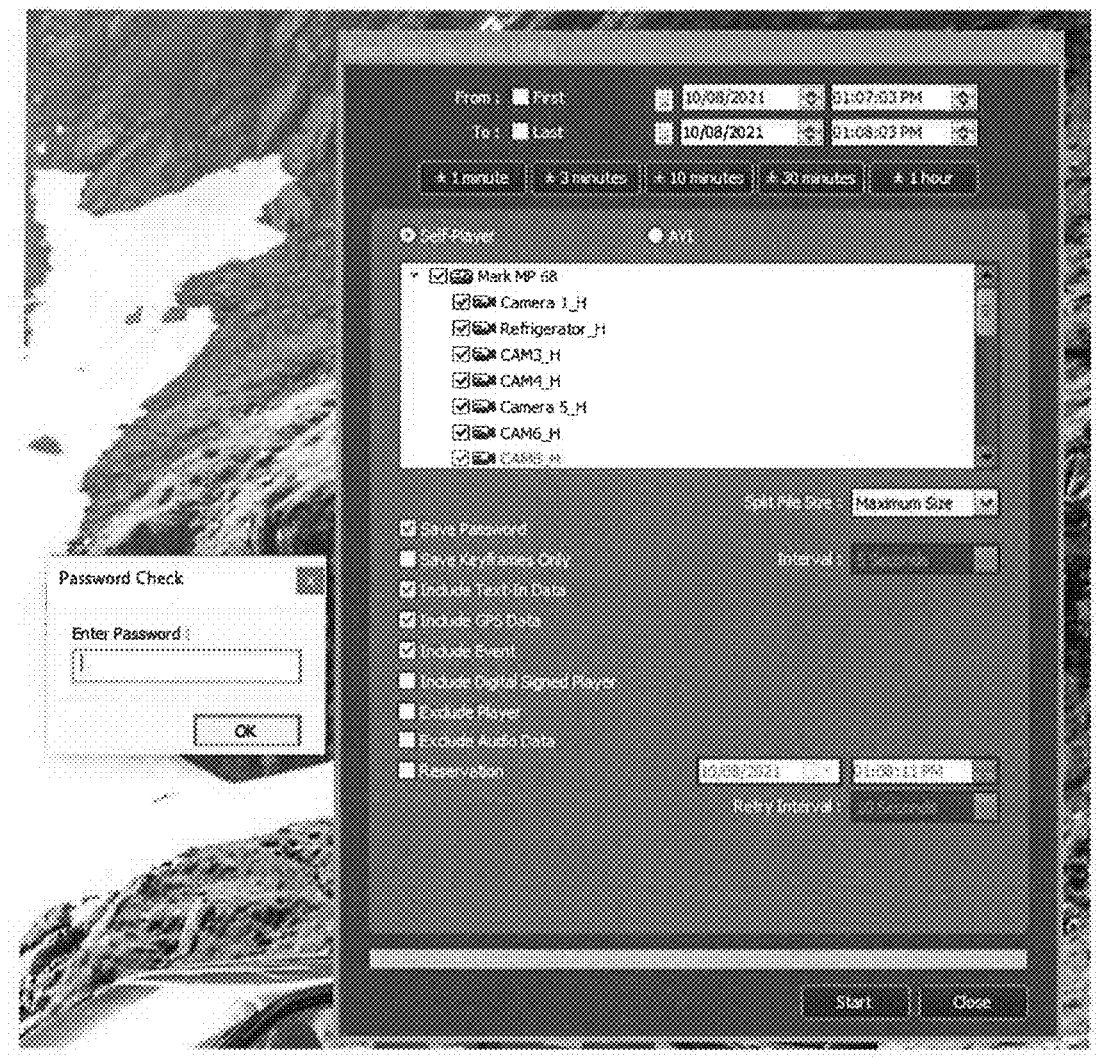
FIG. 19 is an image of video clip (password protected).

The system may also comprise diagnostic and configuration software that allows for video/data playback and configuration (See FIG. 17). The software is designed to be forwards compatible and is preferably completely backwards compatible to all generations of the video recording system. In an exemplary embodiment, the software comprises one or more of the following features:

- password protected video playback software (See FIG. 19);
- ability to search a video based on calendar, time, location GPS, and event;
- save encrypted clip copies;
- user friendly dashboard that may include personnel user layout options (FIG. 17A);
- view event recorder data while playing back video (RS Player);
- easy to use user manual; and The system may further include a download/diagnostic cable which preferably comprises at least one of the following features:

- remote drive viewing;
- view live streaming video and audio;
- remote configuration access;
- remote access to system and event logs; and
- real time playback.

The system may further include a remote monitoring system comprised of one or more ethernet cables that connect any one or more of the components of the system to one another.

In an exemplary embodiment, the system may comprise a router which is especially important for onboard remote monitoring. The router provides router capabilities with fast easy secure access to a back office system. In an exemplary embodiment, the router utilizes a ruggedized platform featuring enterprise class routing, of high-speed performance on 802.11ac or any major 3G/4G/LTE wireless network. The system may also include a PoE switch to power the external components for simple single wire installation.

In an exemplary embodiment, the system comprises locomotive application remote interface ("LARI") hardware which provides the ability to communicate with on-board locomotive systems. The LARI hardware is capable of adapting communications from the video recorder to the ethernet and can perform data translations to support interconnection with multiple on-board systems. The LARI hardware can send and receive a wide variety of data including without limitation time and date information, locomotive performance data, engine data, GPS location information, event recorder data, accelerometer data, and the like.

Figure 14:
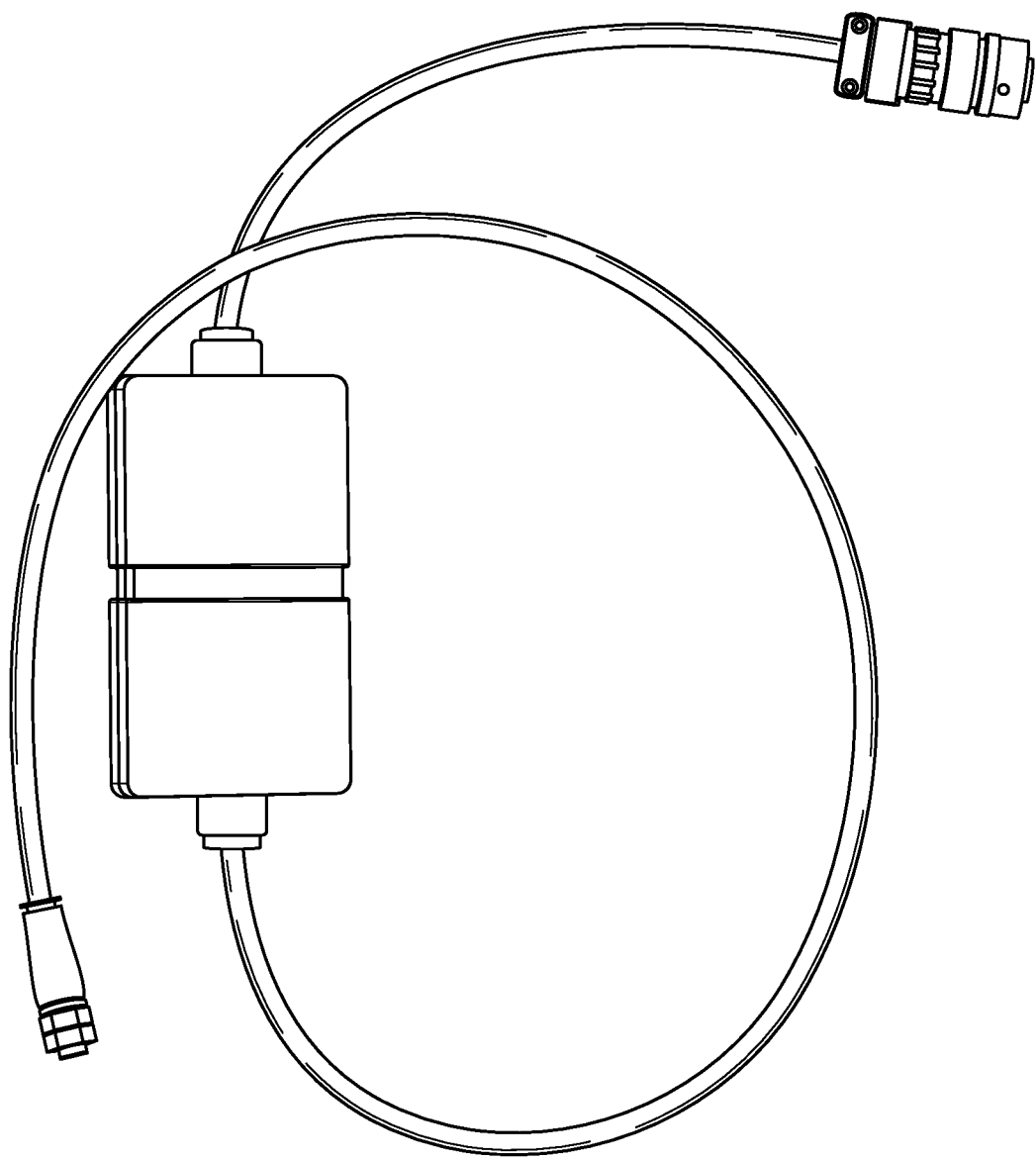
FIG. 14 is an image of an exemplary FWT-LARI-12V Cable.

In an exemplary embodiment, where the system comprises LARI hardware, the system may further comprise an event recorder interface software and cabling to provide periodic remote event recorder downloads. The event recorder interface software enables a user to access a historical record of all downloads taken from a locomotive via the back office. A user can request and view downloads via the web interface and will be able to retrieve requested downloads in a short amount of time (See FIG. 14).

Figure 15:
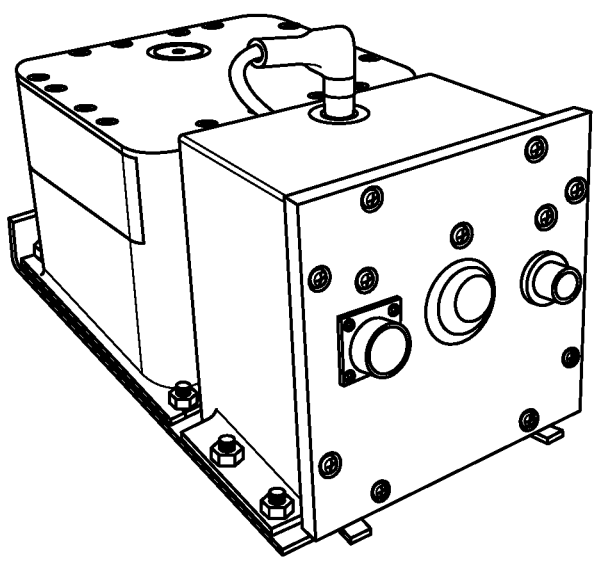
FIG. 15 is an exemplary image of the crash hardened memory module.
Figure 15:
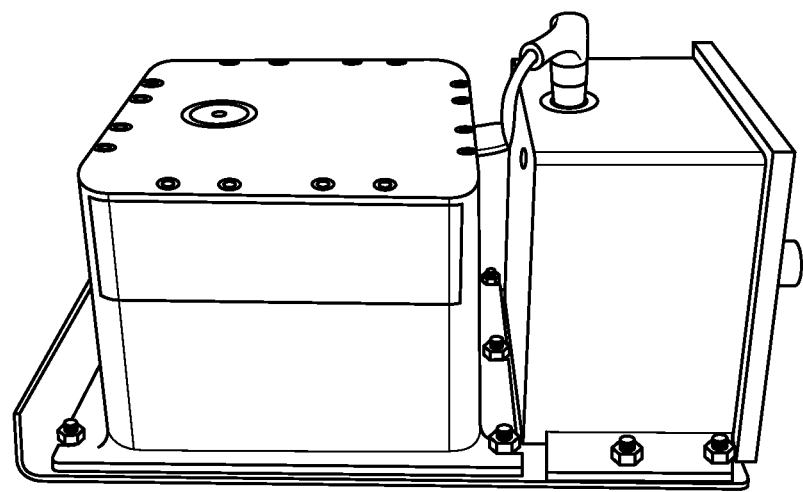

In an exemplary embodiment, the system comprises a crash hardened memory module. The module incorporates the latest high temperature ceramics and structural design to assure memory and video retention in the most severe accidents. Preferably, the module (See FIG. 15) has one or more of the following features:

the module talks over the ethernet;
the module can customize software; and
the module is capable of storing different types of data (video, ER, etc.).

In an exemplary embodiment, the system comprises a fuel sensor to provide fuel level data to the remote monitoring system for display in the back office. The fuel sensor preferably utilizes a single cable which may be connected to the router and which provides data and power. The fuel volume level may be recorded directly to the hard drive and can be utilized for business rules. The fuel sensor may be mounted on a wide variety of fuel tanks. No cutting, welding, or machining of the tank is required thereby minimizing the amount of installation time required for mounting the sensor on the track.

In an exemplary embodiment, the system comprises a software suite that is configured to be remotely upgradeable directly from the back office. The software update can be setup to deploy test software on a specific road number or across the entire asset fleet within only a few days. The remote upgrade feature enables future software enhancements to be easily deployed to the asset without the need for the unit to be shopped or the presence of an onboard field service representative. The monitoring solution will enable users to see asset utilization and duty cycle information for monitored assets. The solution is designed to gather data from various subsystems onboard the assets. The off-board component retrieves and stores periodic sampling of locomotive operational and location data in a central database repository. This information can be viewed and downloaded from the website or be directly accessed as the raw data using industry standard data protocols. In an exemplary embodiment, all data can be exported directly from the web interface into, e.g., Microsoft Excel. Available data gathered facilitates investigation of any reported train incidents. Locomotive operational and location data is invaluable in analyzing locomotive failures and in validating corrective actions.

Figure 18:
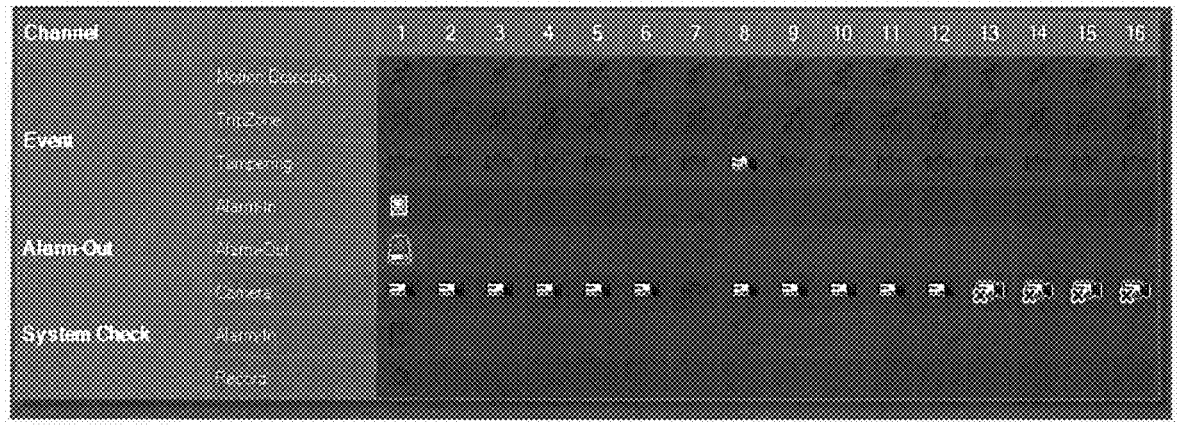
FIG. 18 is an image of camera check output (camera health)

In an exemplary embodiment, the system may comprise back office software which delivers streamlined, fleet-wide management of the video recorder to increase accessibility, reduce maintenance and operating costs, improve efficiency, and mitigate risk and liability. Back office software enables video and fleet information to be continuously accessible to more agency employees, even when locomotives are outside of network range—improving management of fleet operations, security, and maintenance. The software simplifies troubleshooting and reduces maintenance checks with system health reports. It also quickly dispatches maintenance crews with email notification of system health and events. The software automatically uploads video for immediate review without relying on incident reports or removing SSD drives. Automated system reports eliminate manual system checks. Camera health reports reduce the risk of video loss. The software allows video to be uploaded automatically or on-demand from any vehicle to pro-actively respond to incidents. The back-office software provides secure video clips and a chain of custody for reliable evidence management. The back-office software is compatible with digital video recorders and it delivers a fleet-wide solution regardless of the age or size of the systems in a fleet (See FIG. 18).

In an exemplary embodiment, the system may include a fleet wide tracking ("FWT") base. Featuring status reports, event logs and on-demand data retrieval, the FWT base provides simple fleet-wide data management ideal for monitoring fleets. In an exemplary embodiment, the FWT server downloads user-selected portions of video and saves video clips in an executable format, wherein the file includes an embedded player, so there is no software required for viewing. In an exemplary embodiment, archived video clips feature watermarking and encryption to ensure that the video is authentic and has not been subject to tampering. Video clips preferably also feature optional password protection to prevent unauthorized viewing access (See FIG. 19).

Figure 16:
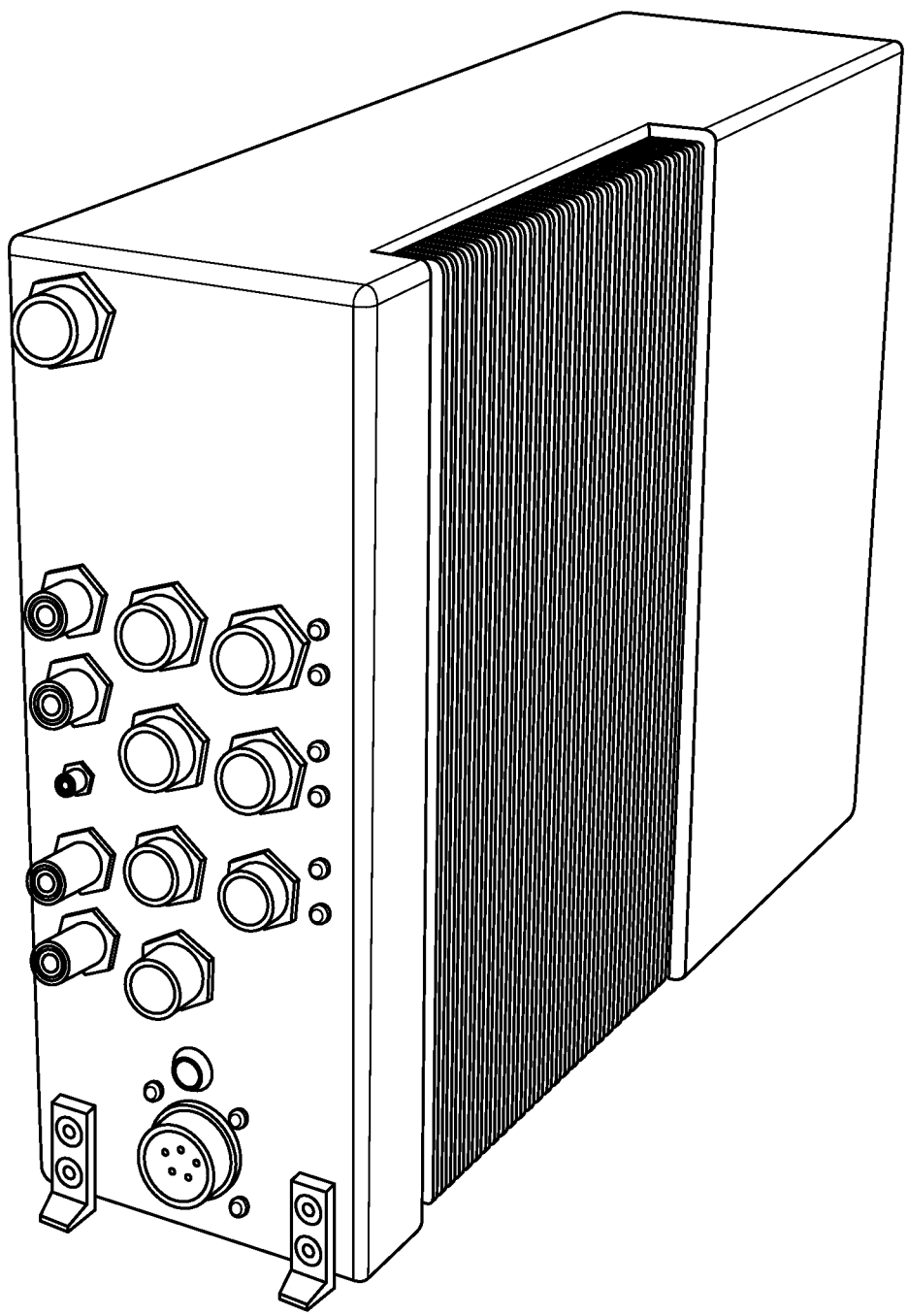
FIG. 16 is an image of the FWT Router.

In an exemplary embodiment, the system may include a FWT health module that provides automatic fleet-wide health monitoring and diagnostics of on-board equipment. With the ability to instantly view, store, print reports or request video clips of health events for download, the health module provides efficient management of video and fleet information with comprehensive and easy to use tools. The health module enables email notifications of system events and includes detailed connection information. Status reports for assets include information regarding the current connections status, information regarding the last events processed from the DVR by the FWT Software and indication of the last communication time. This information can be used to alert users of connectivity problems (See FIG. 16).

In an exemplary embodiment, the system comprises FWT fleet wide tracking. The FWT combines back-office software and on train equipment to alert a deviation from normal procedures on any data channel. Data channels are received from onboard hardware such as event recorders, fuel systems, engine controllers. These channels may be recorded in real time, enabling effective conditions-based maintenance platform. The system may also communicate with the maintenance shops in real time allowing for efficient fault diagnostics and work scheduling. Tracking provides for at least one of the following features:

real-time cross fleet performance monitoring;
vehicle and fleet location tracking and timetable monitoring;
interactive and predictive fault detection for control room;
view cab equipment in real-time from the control room to understand the operator experience;
replay fault events to accurately diagnose root causes and repair actions in the depot; and
transactions may be audited and reported, Therefore, the back office enables real-time monitoring of all third party systems that are connected, and provides the ability to see in historical data as well as live streaming of ER, video, and fuel data.

Another exemplary video recorder, which may include any one or more of the features disclosed herein is depicted in FIG. 13. Referring to FIG. 13, an exemplary video recorder comprises an integrated push-to-test button (the "PTT button"). The PTT button serves a dual purpose of (1) serving as an important warning indicator; and (2) confirming a physical check from railroad personnel. For example, if any of the cameras fail, have physical blockage, become disconnected, or otherwise fail to function at or below optimal ability, a signaling light of the PTT button will flash, and preferably will flash red. Additionally, the PTT button digitally marks the video to thereby confirm that the system has been physically checked by railroad personnel prior to going on a revenue route.

While the disclosure has been shown and described with reference to certain preferred embodiments thereof, it will be understood by those skilled in the art that various changes in form and detail may be made therein without departing from the spirit and scope of the disclosure.

What is claimed is:

1. A mobile surveillance recording system for use in the rail industry, comprising: one or more cameras, wherein each camera captures a first video stream using a high-definition signal and a second video stream using a low-definition signal, wherein the first video stream and the second video stream may be of the same or different video footage; a recording device, wherein the recording device comprises a housing that is constructed to maximize water resistance, shock resistance, voltage resistance, and temperature resistance; and a plurality of modules housed within the housing of the recording device, wherein the plurality of modules allows for remote viewing, playback and administration of the first and second video streams, wherein the one or more cameras comprises up to about 12 cameras, and further wherein the housing of the recording device comprises a plurality of ports wherein each of the ports receives input from one of the cameras of the one or more cameras, wherein the plurality of modules comprises a storage module, wherein the storage module stores the first video stream for up to about 5 days and which stores the second video stream for up to about 30 days, and wherein the system further comprises an LED display comprising a push to test button and a health indicator LED light, wherein when the push to test button is actuated, a system health signal is transmitted to the health indicator LED light, and the health indicator LED light emits a light to represent an operational status of the system, wherein the LED display is positioned on the housing of the recording device.

2. The mobile video surveillance recording system of claim 1, wherein the housing comprises steel.

3. The mobile video surveillance recording system of claim 1, wherein the system further comprises a solid state drive that is disposed within the housing of the recording device.

4. The mobile video surveillance recording system of claim 3, wherein the solid state drive comprises a storage capacity of up to about 8.0 terabytes.

5. The mobile video surveillance recording system of claim 1, wherein the system further comprises a GPS receiver that allows for an interactive speed and mapping interface.

6. The mobile video surveillance recording system of claim 1, wherein the plurality of modules further comprises an audio input module, wherein the audio input module receives audio signals received from one or more audio transmitters, and wherein the housing of the recording device further comprises up to about 14 audio inputs, wherein each of the audio inputs is capable of receiving an audio transmitter.

7. The mobile video surveillance recording system of claim 6, wherein the plurality of modules further comprises a camera replacement module, wherein the camera replacement module auto-connects a replacement camera to the system, and which further auto-configures to the replacement camera to the system.

8. The mobile video surveillance recording system of claim 1, wherein the one or more cameras comprises a first camera having a long-range view and a wide-field view.

9. The mobile video surveillance recording system of claim 1, wherein the system further comprises a locomotive application remote interface hardware that provides the ability to communicate with on-board locomotive systems, wherein the hardware can send and receive data comprising time and date information, locomotive performance data, engine data, GPS location information, event recorder data, and accelerometer data.

10. The mobile video surveillance recording system of claim 9, further comprising an event recorder interface software, wherein the event recorder interface software enables access to a historical record of all downloads taken from a locomotive.

11. The mobile video surveillance recording system of claim 9, further comprising a fuel sensor that provides fuel level data to the locomotive application remote interface hardware, wherein the fuel sensor is mounted on a fuel tank.

12. The mobile video surveillance recording system of claim 1, further comprising a password protected back office software that allows access to data.

13. A mobile video surveillance recording system for use in the rail industry, comprising: one or more cameras, wherein each camera captures a first video stream using a high-definition signal and a second video stream using a low-definition signal, wherein the first video stream and the second video stream may be of the same or different video footage; a recording device, wherein the recording device comprises a housing that is constructed to maximize water resistance, shock resistance, voltage resistance, and temperature resistance; and a plurality of modules housed within the housing of the recording device, wherein the plurality of modules allows for remote viewing, playback and administration of the first and second video streams, an LED display comprising a push to test button and a health indicator LED light, wherein when the push to test button is actuated, a system health signal is transmitted to the health indicator LED light, and the health indicator LED light emits a light to represent an operational status of the system, wherein the LED display is positioned on the housing of the recording device.

* * * * *